United States Patent

[11] 3,607,753

| [72] | Inventor | Lydia A. Suchoff<br>New Shrewsbury, N.J. |
|---|---|---|
| [21] | Appl. No. | 684,603 |
| [22] | Filed | Nov. 16, 1967 |
| [45] | Patented | Sept. 21, 1971 |
| [73] | Assignee | The United States of America as represented by the Secretary of the Army |

[54] METHOD OF MAKING LITHIUM FERRITE POWDERS
6 Claims, No Drawings

[52] U.S. Cl. ................................................ 252/62.61,
23/51
[51] Int. Cl. .................................................. C04b 35/26
[50] Field of Search ....................................... 252/62.56,
62.61; 106/39; 34/5; 264/15; 23/51, 293, 294

[56] References Cited
UNITED STATES PATENTS

| 3,484,376 | 12/1969 | Paris et al. ..................... | 252/62.61 |
|---|---|---|---|
| 3,516,935 | 6/1970 | Monforte et al. .............. | 252/62.56 |
| 3,189,550 | 6/1965 | Malinofsky ..................... | 252/62.62 |
| 3,317,574 | 5/1967 | Morita et al. .................. | 252/62.56 |
| 3,218,726 | 11/1965 | Muir ............................... | 34/5 |
| 3,281,950 | 11/1966 | Kautz ............................. | 34/5 |
| 3,422,167 | 1/1969 | Bowman et al. ............... | 264/.5 |

FOREIGN PATENTS

| 644,639 | 10/1950 | Great Britain ................. | 252/62.56 |
|---|---|---|---|
| 1,367,944 | 6/1964 | France ........................... | 252/62.61 |

OTHER REFERENCES

Landsberg et al. - Freeze-Dry Technique For Making Ultra-Fine Metal Powder - Journal of Metals August 1965 pages 856– 860 copy in Patent Office Search Center

*Primary Examiner*—Robert D. Edmonds
*Attorneys*—Harry Saragovitz, Edward J. Kelly, Herbert Berl and Roy E. Gordon

ABSTRACT: Ceramic powders of uniform and fine particle size are made by freeze drying a liquid solution of ceramic forming metallic salts, subliming the solvent, and applying heat to decompose the remaining solute to a ceramic powder.

METHOD OF MAKING LITHIUM FERRITE POWDERS

The invention described herein may be manufactured, used, and licensed by or for the Government for governmental purposes without the payment to me of any royalty thereon.

BACKGROUND OF THE INVENTION

Ceramic materials in powder form are used in the fabrication of components used in magnetic and dielectric applications. These are used to form bulk shapes by compressing them and firing to sinter the particles. Another use is in the fabrication of thin (micron thick) ceramic sheets or films. Interest is growing in the magnetic and dielectric fields in the application of such films. The composition, purity, homogeneity and particle size of ceramic powders bear a direct relationship to the characteristics of the end products. In the case of the film products, the importance of particle size becomes critical.

Powders prepared by standard ceramic practices have a wide range of particle sizes and, to obtain ultrafine particles, it is necessary to ball mill for long periods of time which increases contamination and the powders still have a wide distribution of particle sizes.

The general object of this invention is to provide a method of making ceramic powders of controlled particle size. A more specific object of this invention is to provide a method of making ceramic powders of uniform and fine particle size suitable for use in the fabrication of thin ceramic sheets or films.

SUMMARY OF THE INVENTION

Ceramic powders of uniform and fine particle size are obtained by freeze drying a liquid solution of ceramic forming metallic salts, subliming the solvent, and applying heat to decompose the remaining solute to a ceramic powder.

In essence, advantage is taken of the homogeneous dispersion of all solutes in solution. If a solution containing non volatile solutes is frozen instantaneously so as not to allow precipitation of any one solute and the solvent is then sublimed without melting as in vacuum, the solute(s) will remain as solids in the state of subdivision and homogeneity of the original solution.

The solute or ceramic forming metallic salts used may be metallic salts of sulfates, acetates, oxalates, etc. The solvent used may be water, alcohol, or generally any solvent that is easily sublimable.

When using water as the solvent, it is especially desirable to make the ceramic powders using metallic salts of the oxalates. This is because oxalate salts decompose at low temperatures without liquefaction with sublimation of oxalic acid or its decomposition products leaving the oxide of the metals as residue. Differential thermal analysis and X-ray analysis show that this decomposition occurs at about 200° C. and that residual oxides are reacted in cases where multicomponent systems are used. Electron microscope studies of the powders so obtained show that the particles are very small, i.e., about 0.04 micron diameter in size. The particle size will vary depending on the original concentration of the solute in the solution. Generally, the greater the concentration of solute, the larger the particle size, and vice versa. Moreover, uniformity of particle size is very good. Hot pressing of these powders does not result in appreciable growth of the particles or growth of some particles at the expense of others. Annealing results in a sharp increase of particle size. However, this increase is uniform and is not confined to a number of particles.

DETAILED DESCRIPTION OF THE PREFERRED EMBODIMENTS

Example 1

A solution of lithium oxalate and ferric oxalate in water is prepared in the ratio of 1 part lithium to 5 parts iron. The total concentration of lithium and iron is 0.0358 grams per milliliter. The solution is added dropwise to liquid nitrogen and then placed in a vacuum chamber and evacuated to remove all water. The resultant oxalates are decomposed at 300° C. to obtain lithium ferrite.

Example 2

A solution of lithium oxalate, zinc oxalate and iron oxalate in the ratio of 4 lithium to 2 parts zinc to 22.8 parts iron is prepared. The total concentration of lithium, zinc, and iron is 0.0495 grams per milliliter. The solution is treated as in Example 1 above to obtain lithium zinc ferrite.

The foregoing description is to be considered merely as illustrative of the invention and not in limitation thereof.

What I claim is:

1. A method of making lithium ferrite ceramic powder of uniform and fine particle size comprising preparing an aqueous solution of lithium oxalate and ferric oxalate, adding the solution dropwise to liquid nitrogen, placing the frozen solution in a vacuum chamber and evacuating to remove all water, and decomposing the oxalates at about 200° to 300° C. to obtain the lithium ferrite.

2. A method of making lithium ferrite ceramic powder of uniform and fine particle size comprising preparing an aqueous solution of lithium oxalate and ferric oxalate, adding the solution dropwise to liquid nitrogen, placing the frozen solution in a vacuum chamber and evacuating to remove all water, and decomposing the oxalates at least about 200° C. to obtain the lithium ferrite.

3. A method of making lithium ferrite ceramic powder of uniform and fine particle size consisting of preparing an aqueous solution of lithium oxalate and ferric oxalate, adding the solution dropwise to liquid nitrogen, placing the frozen solution in a vacuum chamber and evacuating to remove all water, and decomposing the oxalates at about 300° C. to obtain the lithium ferrite.

4. A method of making lithium zinc ferrite ceramic powder of uniform and fine particle size comprising preparing an aqueous solution of the oxalates of lithium, zinc and iron in the ratio of 4 parts lithium to 2 parts zinc to 22.8 parts iron, adding the solution dropwise to liquid nitrogen, placing the solution in a vacuum chamber and evacuating to remove all water, and decomposing the oxalates at about 200° to 300° C. to obtain the lithium zinc ferrite.

5. A method of making lithium zinc ferrite ceramic powder of uniform and fine particle size comprising preparing an aqueous solution of the oxalates of lithium, zinc and iron in the ratio of 4 parts lithium to 2 parts zinc to 22.8 parts iron, adding the solution dropwise to liquid nitrogen, placing the frozen solution in a vacuum chamber and evacuating to remove all water, and decomposing the oxalates at at least about 200° C. to obtain the lithium zinc ferrite.

6. A method of making lithium zinc ferrite ceramic powder of uniform and fine particle size consisting of preparing an aqueous solution of the oxalates of lithium, zinc and iron in the ratio of 4 parts lithium to 2 parts zinc to 22.8 parts iron, adding the solution dropwise to liquid nitrogen, placing the frozen solution in a vacuum chamber and evacuating to remove all water, and decomposing the oxalates at about 300° C. to obtain the lithium zinc ferrite.